United States Patent Office 3,751,439
Patented Aug. 7, 1973

3,751,439
CRYSTALLINE NICKEL CHELATE OF 1-NITROSO-2-NAPHTHOL AND PROCESS FOR PRODUCING SAME
Richard Knight Putney, Hudson Falls, N.Y., assignor to Hercules Incorporated, Wilmington, Del.
No Drawing. Filed Feb. 24, 1972, Ser. No. 229,168
Int. Cl. C07f 15/04; C08h 17/14
U.S. Cl. 260—439 R                    10 Claims

ABSTRACT OF THE DISCLOSURE

Pigmentary compositions comprising an intimate dispersion of a crystalline, light-stable nickel chelate of 1-nitroso-2-naphthol and from 0.10 to 1.0 mole, per mole of the nickel chelate, of certain ester plasticizers are described. The compositions have improved texture and dispersibility and are produced by wetting the hydrated nickel chelate of 1-nitroso-2-naphthol in aqueous medium with the plasticizer, isolating the wetted chelate and then heating the isolated product at 65–105° C. until dehydration is complete and the chelate is converted to its crystalline, light-stable form.

This invention relates to a process for producing a crystalline, light-stable nickel chelate of 1-nitroso-2-naphthol and to the crystalline, light-stable nickel chelate composition so produced.

Crystalline, light-stable nickel chelates of 1-nitroso-2-naphthol having an X-ray diffraction pattern characterized by strongest interplanar spacings, referred to as $d$-spacings, at about 11.6, 9.6, 6.0, 4.9, 4.5, and 3.6 angstroms are known to the art and are shown by C. G. Inman in U.S. Pat. 3,338,937 and by A. S. Matlack in U.S. Pat. 3,338,938. The crystalline, light-stable nickel chelates are produced by either an aqueous or an organic process. In the aqueous process the crystalline nickel chelate is produced by forming a nickel salt of 1-nitroso-2-naphthol in aqueous medium, recovering and drying the product and then heating the dried product at above about 120° C. until it is converted to the crystalline, light-stable form of the nickel chelate. In the organic process the crystalline nickel chelate is produced by reacting a nickel compound with a solution of 1-nitroso-2-naphthol in an inert liquid organic diluent which is a solvent for 1-nitroso-2-naphthol and is essentially a nonsolvent for the nickel chelate, recovering the product from the diluent and then treating the product with an electron donor solvent which is at least a partial solvent for the product at a temperature of at least about 50° C. until the crystalline, light-stable nickel chelate is formed.

Now in accordance with the present invention it has been found that the crystalline, light-stable nickel chelate of 1-nitroso-2-naphthol can also be produced by treating a hydrated nickel chelate of 1-nitroso-2-naphthol in aqueous medium with a poly(vinyl chloride) ester plasticizer and then drying the chelate, and that the chelate composition so produced additionally has a softer texture and is more easily dispersed than the chelates produced by either the Inman or Matlack processes.

Accordingly, the present invention is directed to a process for producing a crystalline, light-stable nickel chelate of 1-nitroso-2-naphthol characterized by having an X-ray diffraction pattern which exhibits strongest $d$-spacings at about 11.6, 9.6, 6.0, 4.9, 4.5 and 3.6 angstroms, which process comprises treating particles of a hydrated nickel chelate of 1-nitroso-2-naphthol in aqueous medium with from about 0.10 to about 1.0 mole based on each mole of the nickel chelate of an inert, water-immiscible poly(vinyl chloride) ester plasticizer which is a nonsolvent for the nickel chelate and has a boiling point above about 200° C., until the particles are wetted by the plasticizer, isolating the wetted product from the aqueous medium, and then heating the isolated product at a temperature ranging from about 65° C. to about 105° C. until the product is dehydrated and converted to the anhydrous, crystalline, light-stable form, and to the novel compositions so produced. Thus, the invention provides processing advantages and economies not realized by the prior art by avoiding the necessity of using volatile organic solvents and/or high processing temperatures, and additionally provides a softer textured, more easily dispersible form of the crystalline, light-stable nickel chelate.

The hydrated chelate which is treated in aqueous medium in accordance with the process of the invention can be formed in various ways. For example, the hydrated chelate can be an aqueous dispersion of the precipitated nickel chelate in the aqueous reaction medium in which the chelate is formed, can be a water-wet presscake of the precipitated chelate, or, if desired, can be a washed and dried chelate which has been rewetted with water. Preferably, the hydrated chelate which is treated in aqueous medium is an aqueous suspension of the nickel chelate in the reaction medium in which it has been precipitated. Such hydrated chelates can be prepared in aqueous medium in various ways. For example, in one preferred procedure, the hydrated nickel chelate of 1-nitroso-2-naphthol is formed by nitrosating an aqueous slurry of beta-naphthol with an aqueous solution of sodium nitrite at about 40° C. in the presence of mineral acids and the nickel compound, the acid being fed slowly to an alkaline solution of the beta-naphthol to adjust the pH to about 4.0 to 4.5 and, after nitrosation is completed, increasing the temperature of the aqueous reaction medium to about 95 to 97° C. to complete chelation. Alternatively, in this procedure the nickel compound can be added to the aqueous medium after nitrosation is completed rather than prior to nitrosation. These procedures have the advantage of enabling nitrosation and chelation to be carried out in a single process step. Although the nickel compound can be added to the reaction medium at any time, i.e., before, during or after nitrosation, the nickel compound is preferably introduced after sufficient acid has been added to reduce the pH below about 9. The chelation takes place readily at room temperature or below but is ideally conducted at from room temperature up to the boiling point of the medium.

In a second procedure, the hydrated nickel chelate of 1-nitroso-2-naphthol can be formed by reacting an aqueous ammonical solution of 1-nitroso-2-naphthol with a nickel compound at a temperature below about 40° C. In this procedure, sufficient ammonia is present to maintain at least some, if not a large part, of the nitroso naphthol in solution and to maintain the medium basic. However, the amount of ammonia present as ammonium hydroxide is not critical, and large excesses may be used without being harmful to the reaction. For most practical purposes, from about 0.5 to about 10 moles, and preferably about 3 to about 5 moles, of ammonium hydroxide per mole of 1-nitroso-2-naphthol will be sufficient. The reaction takes place readily at below about 40° C. within short periods of time, but preferably is conducted at below 35° C., and more preferably at about 0° C. to about room temperature for times varying up to about several hours.

The 1-nitroso-2-naphthol used for reaction with the nickel salt can be prepared by any of the methods given in the literature for nitrosating beta-naphthol, as, for example, according to the preparations given in Beilstein's Handbuch der Organischen Chemie, 4th Ed., 7, 712 (1925), 1st Supplement, 385 (1931), 2d Supplement, 647 (1948), Verlag von Julius Springer, Berlin, or by Marvel and Porter, Organic Syntheses, 2, 61 (1922) or by the procedure of U.S. Pat. No. 3,051,750 to Dettwyler (1962).

The amount of nickel compound used in the formation of the chelate by either of the above procedures should be sufficient to complex all of the nitroso naphthol, and preferably will not exceed the ratio of 1.1 atoms of nickel per 2 molecules of 1-nitroso-2-naphthol since large excesses of nickel should be avoided.

Any nickel compound which is reactive with 1-nitroso-2-naphthol in aqueous medium can be used to produce the hydrated nickel chelate, and the nickel compound can be added to the reaction medium as a solid or as an aqueous solution. Preferred nickel compounds include such nickel salts as the sulfate, nitrate, bromide, chloride, acetate, formate, and the propionate of nickel.

In accordance with the invention, particles of the hydrated nickel chelate of 1-nitroso-2-naphthol are treated in aqueous medium with from about 0.10 to about 1.0 mole of certain water-immiscible, nonvolatile poly(vinyl chloride) ester plasticizers per mole of chelate until the particles are wetted by the plasticizer. The plasticizer is an inert liquid or an inert low melting solid which is nonvolatile under processing conditions, is a nonsolvent for the nickel chelate, is water-immiscible and has a boiling point above about 200° C. A wide variety of ester plasticizers meet the above requirements and are suitable for use in accordance with the invention. Particularly useful are the diesters of dicarboxylic acids and saturated monohydric alcohols, pentaerythritol fatty acid esters, abietic acid esters, epoxidized fatty acid esters and phosphoric acid esters. Preferred plasticizers include the dialkyl-, diaryl- or alkyl aryl-esters of aromatic or saturated or unsaturated aliphatic dicarboxylic acids, the tetraacyl esters of pentaerythritol, the alkyl abietates, the alkyl epoxy fatty acid esters and the alkyl-, aryl-, aralkyl-, alkaryl- or alkyl-aryl- phosphates. Typical plasticizers include dibutylphthlate, diisooctylphthalate, dioctylphthalate, butyl-octyl-phthalate, n-octyl-n-decylphthalate, dicyclohexylphthalate, diphenylphthalate, butylbenzylphthalate, dibutyl adipate, diisooctyl adipate, benzyloctyl adipate, di-2-ethylbutyl azelate, di-n-hexyl azelate, dibutyl fumarate, dicyclohexyl maleate, dibutyl maleate, dioctyl maleate, dibutyl itaconate, dioctyl sebacate, the pentaerythritol tetraester of mixed $C_4$ to $C_9$ acids, pentaerythritol tetrastearate, methyl abietate, hydrogenated methyl abietate, epoxidized octyl tallate, triphenyl phosphate, cresyl diphenyl phosphate, tricresyl phosphate, tri-dimethylphenyl phospate, 2-ethylhexyl diphenyl phosphate, and trixenyl phosphate.

Treatment of the particles in aqueous medium can be carried out in any convenient manner for wetting a solid with a liquid and preferably at a temperature which is below about 100° C. As stated, the amount of plasticizer will range from about 0.10 to about 1.0 mole per mole of nickel chelate. Preferably the plasticizer will be present in an amount ranging from about 0.15 to about 0.35 and most preferably from about 0.2 to about 0.3 mole per mole of the chelate, and the treatment will be carried out by stirring or milling an aqueous slurry of the pigment and plasticizer in water at a temperature ranging from about 25° C. to about 75° C. for from about 2 to about 40 hours. The amount of water present during the treatment is largely a matter of choice but must be sufficient to provide a fluidity to the mixture and permit effective contact of the nickel chelate particles and the plasticizer. Usually, the pigment content of the mixture will be from about 2 to about 8% by weight.

The wetted product is next isolated from the aqueous medium. This can be accomplished in any known manner for separating a solid from a liquid, such as by decantation, filtration or centrifugation.

In accordance with this invention, the isolated product is heated at a temperature of from about 65° C. to about 105° C. until dehydration is complete and the product is converted to the anhydrous, crystalline, light-stable form of the nickel chelate. The time required to dehydrate and convert the product to its crystalline, light-stable form will vary, of course, depending upon the manner and conditions of heating with longer times being required at the lower temperatures. Preferably, the heating is carried out at from about 75° C. to about 105° C. for a period of time up to about 48 hours, and more preferably at from about 82° C. to about 98° C.

The crystalline, light-stable nickel chelate of this invention is believed to contain two molecules of 1-nitroso-2-naphthol per atom of nickel and to have the probable structure illustrated by the following formulae:

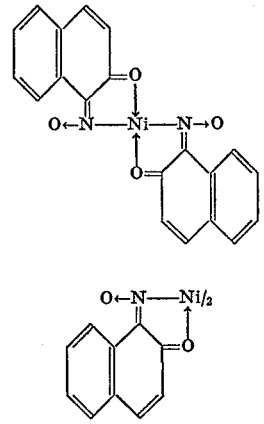

or

This chelate is characterized by an X-ray diffraction pattern which exhibits strongest $d$-spacings at about 11.6, 9.6, 6.0, 4.9, 4.5, and 3.6 angstroms, is a brown solid decomposing above 300° C., and is insoluble or only slightly soluble in water and most of the common organic solvents. In addition to exhibiting excellent lightfastness, the chelate possesses high transparency, good tinctorial strength, good stability to dilute acids and alkalies, good heat stability, and excellent bleed resistance in nonpolar solvents. It is of value as a pigment in numerous applications but has particular value as a pigment in enamels applied to metallic substrates or when used in conjunction with finely divided metallic particles, or as a pigment for plastics where it exhibits excellent lightfastness.

The invention will be illustrated by reference to the following examples in which all percentages are by weight unless otherwise specified.

EXAMPLE 1

A solution of 29.5 grams (0.205 mole) of beta-naphthol dissolved in 8.2 grams of sodium hydroxide in 100 grams of water at 80° C. is stirred into 700 grams of water containing 6.6 grams of sodium acetate and 1.4 grams of the sodium salt of condensed naphthalene sulfonic acid as dispersing agent. The solution is diluted with water to 1100 milliliters at 40° C., after which a solution of 12.55 grams of sulfuric acid in 244 grams of water is added slowly and uniformly with stirring over a period of 50 minutes to give an aqueous dispersion of finely reprecipitated beta-naphthol at a pH of about 4.0 to 4.5.

A solution of 27.5 grams (0.105 mole) of nickel sulfate hexahydrate, $NiSO_4 \cdot 6H_2O$, in 100 grams of water is added as rapidly as possible to the above dispersion with stirring and the mixture is maintained at 40° C. with continued agitation while 14.9 grams (0.216 mole) of sodium nitrite in 300 grams of water is introduced in 2 equal portions, the first portion being added uniformly over 6 minutes and the second portion being added uniformly over the next 60 minutes. The resulting brown slurry is next heated to 95–97° C. at the rate of 1° C. per minute and stirred for an additional hour at that temperature after which the slurry is cooled to 60° C. by dilution with cold water. Next 9.0 grams of dioctylphthalate (equivalent to 0.25 mole per mole of nickel chelate) is added to the slurry and the slurry is agitated at 50–60° C. for four hours. The slurry is then filtered to remove the solids, the solids are washed free of water-soluble sulfates and the washed solids are dried for 24 hours at 82° C. in a steam-heated hot-air tray dryer oven. The dried product is 49 grams of a reddish-brown pigmentary material. The product is easily crushed to a soft powder by hammer-milling through a 1/16" screen. Analysis for nickel content (11.8%) and for easily volatile constituents (0.23% during 6 hours of heating at 105° C.) confirms that the product is essentially free of water of hydration and contains approximately 82% of the nickel chelate of 1-nitroso-2-naphthol and 18% of dioctylphthalate. A volatility test carried out on pure dioctylphthalate gives negligible volatility under identical treatment conditions. The product exhibits the following X-ray diffraction pattern.

| Line | $2\phi$ | d, A.[1] | I[2] | Percent I/I max.[3] |
|------|------|------|------|------|
| 1 | 7.6 | 11.7 | 2,800 | 100 |
| 2 | 9.2 | 9.6 | 1,230 | 44 |
| 3 | 12.7 | 6.9 | 280 | 10 |
| 4 | 14.8 | 6.0 | 1,230 | 44 |
| 5 | 18.1 | 4.90 | 1,090 | 39 |
| 6 | 19.5 | 4.56 | 895 | 32 |
| 7 | 21.2 | 4.18 | 505 | 18 |
| 8 | 24.5 | 3.63 | 1,345 | 48 |
| 9 | 25.5 | 3.49 | 560 | 20 |
| 10 | 32.5 | 2.75 | 280 | 10 |

[1] d, A.=Interplanar spacing expressed in angstrom units.
[2] I=Intensity in counts per second over background.
[3] I/I max.=Relative intensity.

Lightfastness of the pigmentary product of this example and the pigment prepared according to Example 8 of the aforesaid Inman U.S. Pat. 3,338,937 (hereinafter referred to as the Inman pigment) are compared on paper drawouts in a Fadeometer. The inks for these drawouts are prepared by mulling the pigments in litho varnish and then reducing the resulting dispersions with either aluminum hydrate paste or zinc white paste, the same pigment-to-vehicle ratio and same reduction being employed for each. Both pigments show slight fading after 200 hours of exposure of the zinc white drawout and after 400 hours of exposure of the aluminum hydrate drawout and exhibit excellent lightfastness.

The dispersibility characteristics of the pigment of this example and the Inman pigment are evaluated as follows:

Vinyl film

A vinyl film formulation is prepared by compounding the following components:

| | Parts |
|---|---|
| Vinyl chloride-coating resin (containing 97% vinyl chloride and 3% vinyl acetate) | 126 |
| Dioctylphthalate | 72 |
| Lead stearate | 2 |
| Pigment | 0.24 | on a 2-roll mill at 310° F. and then casting the formulation by pressing out into a 20 mil film. The pigmentary product of this example disperses completely after 3 minutes of compounding whereas the Inman pigment at the same toner level shows incomplete color development and specking after 12 minutes of compounding.

Nitrocellulose lacquer

A nitrocellulose lacquer chip formulation is prepared by milling the following ingredients for 8 minutes on a 2-roll mill:

| | Parts |
|---|---|
| Pigment (100% toner) | 37.5 |
| RS ¼ sec. nitrocellulose | 47.4 |
| RS ½ sec. nitrocellulose | 20.0 |
| Dibutyl phthalate[1] | 17.5 |
| Oleic acid | 2.6 |
| Thinner (50:50 toluene:ethylacetate, by volume) | 30.0 |

[1] Total amount; the amount of dibutyl phthalate was reduced by the amount of the dioctyl phthalate present in the case of the pigment of this example.

An excellent dispersion is obtained with the pigment of this example without overheating after 8 minutes of milling. By comparison, incomplete development of color strength and overheating occur with the Inman pigment, and further milling to improve dispersion is not feasible due to the hazards involved.

The above formulation is thinned to give a nitrocellulose lacquer containing 3% of pigment and further evaluated by applying the lacquer as a coating on paper-backed, shellac-coated aluminum foil. The coating prepared with the pigment of this example gives a more intense color and exhibits better gloss and clarity than the coating prepared with the Inman pigment. After 270 hours of testing in a Weather-O-Meter, the coating prepared from the pigment of this example shows less haze and discoloration than the coating prepared with the Inman pigment.

EXAMPLES 2–8

In these examples, the procedure of Example 1 is followed except that various plasticizers and/or amounts are substituted for the 9 grams of dioctyl phthalate and in Example 2 the temperature and time of agitation are varied as indicated. The type and amount of plasticizer used in each of these examples are shown in Table I below.

TABLE I

| | Plasticizer | | |
|---|---|---|---|
| Example number | Name | Amount (grams) | Molar ratio of plasticizer to nickel chelate |
| 2 | Dibutyl phthalate | a 8.8 | 0.32 |
| 3 | Methyl abietate | 7.8 | 0.25 |
| 4 | Dioctyl maleate | 8.0 | 0.24 |
| 5 | Diisooctyl phthalate | 9.9 | 0.25 |
| 6 | Dibutyl itaconate | 6.1 | 0.25 |
| 7 | Octyl epoxytallate | 10.1 | 0.25 |
| 8 | Diphenyl phthalate | 20.0 | 0.63 | a Agitation time 16 hrs. at 25° C.

The products of these examples exhibit the same X-ray diffraction pattern as the product of Example 1, and are soft in texture and easily dispersed in vinyl sheet formulations indicating that the water of hydration has been removed and that the plasticizer is retained in the product. When the products are tested on paper drawouts in a Fadeometer, the lightfastness for Examples 2 to 8 is comparable to that of Example 1.

EXAMPLE 9

A nickel chelate is produced following the procedure of Example 1 except that after heating the brown slurry to 95–97° C. and stirring for an additional hour the slurry is cooled to 60° C., and the hydrated nickel chelate precipitate is isolated by filtering off the solids and washing the filter cake free of salts. A portion of the cake equivalent to 35 grams (dihydrate basis) is next pebble milled for 16 hours with 6.5 grams of diphenyl phthalate (equivalent to 0.26 mole per mole of nickel chelate) in 605 grams of water at 25° C. using 740 grams of 1 inch diameter pebbles in a quart crock. The milled product is then screened, filtered and dried at 82° C. for 48 hours. The product of this example has properties similar to that of Example 1. Additionally, the product of this example exhibits good brightness, clarity and permanency when evaluated in an alkyd-melamine enamel by dispersing the product in the enamel vehicle, applying the enamel to aluminum foil and then heating the coated foil for 30 minutes at 121° C.

EXAMPLE 10

The procedure of Example 9 is repeated except that 56 grams (dihydrate basis) of the cake is shot milled for 16 hours with 10.4 grams of diphenyl phthalate (equivalent to 0.26 mole per mole of nickle chelate) in 404 grams of water containing 2.0 ml. of 28% aqueous ammonium hydroxide and 4.8 grams of sodium chromate at 25° C. using 4800 grams of ⅛" diameter steel shot in a two-quart screw-cap jar. The product of this example is identical with that of Example 9.

EXAMPLE 11

The precipitation procedure of Example 9 is repeated and the washed filter cake is dried for 24 hours at 70° C. and then for 24 hours at 80° C. and then the dried product is ground by hammer-milling through a 1/32″ screen. Analysis of this product shows it to contain 13.2% nickel and 8.0% water (volatile constituents after heating for 6 hours at 105° C.). X-ray diffraction analysis confirms its identity with the fugitive intermediate dihydrated nickel chelate designated as product A in Example 1 of Inman's U.S. Pat. 3,338,937, and its difference from the product of Example 1 of this invention. A 56 gram portion of the above ground material is next reslurried in 404 grams of water at 25° C. and then shot milled according to the procedure of Example 10. The product of this example is comparable to that of Example 10.

EXAMPLES 12–19

The procedure of Example 10 is repeated except that in these examples the type and amount of plasticizer are varied, as indicated below in Table II.

TABLE II

| Example number | Plasticizer Name | Amount (grams) | Molar ratio of plasticizer to nickel chelate |
|---|---|---|---|
| 12 | Dicyclohexyl maleate | 26.0 | 0.73 |
| 13 | Dicyclohexyl phthalate | 26.0 | 0.62 |
| 14 | Pentaerythritol tetrastearate | 26.0 | 0.17 |
| 15 | Triphenyl phosphate | 26.0 | 0.62 |
| 16 | Dibutyl phthalate | 5.8 | 0.16 |
| 17 | do | 11.7 | 0.32 |
| 18 | Dibutyl maleate | 8.0 | 0.28 |
| 19 | Methyl abietate | 10.4 | 0.26 |

The products of these examples are comparable to that of Example 10. When evaluated in nitrocellulose lacquer or vinyl film according to the procedure of Example 1, the products give complete dispersions with minimum compounding time and show good color development.

What I claim and desire to protect by Letters Patent is:

1. A process for producing a crystalline, light-stable nickel chelate of 1-nitroso-2-naphthol characterized by having an X-ray diffraction pattern which exhibits strongest $d$-spacings at about 11.6, 9.6, 6.0, 4.9, 4.5 and 3.6 angstroms, which process comprises treating particles of a hydrated nickel chelate of 1-nitroso-2-naphthol in aqueous medium with from about 0.10 to about 1.0 mole per mole of chelate of an inert, water-immiscible, poly (vinyl chloride) ester plasticizer which is a nonsolvent for the nickel chelate and has a boiling point above about 200° C., until the particles are wetted by the plasticizer, isolating the wetted product from the aqueous medium, and then heating the isolated product at a temperature ranging from about 65° C. to about 105° C. until the product is dehydrated and converted to the anhydrous, crystalline, light-stable form.

2. The process of claim 1 wherein the hydrated nickel chelate is in the form of presscake.

3. The process of claim 1 wherein the aqueous medium is the aqueous reaction medium in which the hydrated nickel chelate is formed.

4. The process of claim 3 wherein the plasticizer is selected from the group consisting of diesters of dicarboxylic acids and saturated monohydric alcohols, pentaerythritol fatty acid esters, abietic acid esters, epoxidized fatty acid esters and phosphoric acid esters.

5. A composition of matter comprising an intimate dispersion of an anhydrous, crystalline, light-stable nickel chelate of 1-nitroso-2-naphthol characterized by having an X-ray diffraction pattern which exhibits strongest $d$-spacings at about 11.6, 9,6, 6.0, 4.9, 4.5 and 3.6 angstroms and, per mole of the nickel chelate, from about 0.10 to about 1.0 mole of an inert, water-immiscible, poly(vinyl chloride) ester plasticizer which is a nonsolvent for the nickel chelate and has a boiling point above about 200° C.

6. The composition of claim 5 wherein the plasticizer is selected from the group consisting of diesters of dicarboxylic acids and saturated monohydric alcohols, pentaerythritol fatty acid esters, abietic acid esters, epoxidized fatty acid esters and phosphoric acid esters.

7. The composition of claim 6 wherein the plasticizer is a diester of phthalic acid.

8. The composition of claim 7 wherein the amount of diester ranges from about 0.15 to about 0.35 mole per mole of the nickel chelate.

9. The composition of claim 8 wherein the diester is dioctyl phthalate.

10. The composition of claim 8 wherein the diester is dibutyl phthalate.

References Cited

UNITED STATES PATENTS

| 2,178,809 | 11/1939 | Rosenblatt | 260—439 R |
| 3,338,937 | 8/1967 | Inman | 260—439 R |
| 3,338,938 | 8/1967 | Matlack | 260—439 R |

DANIEL E. WYMAN, Primary Examiner

A. P. DEMERS, Assistant Examiner

U.S. Cl. X.R.

106—204, 288 Q, 309; 260—41 C